(12) United States Patent
Morgan et al.

(10) Patent No.: US 9,077,956 B1
(45) Date of Patent: Jul. 7, 2015

(54) SCENE IDENTIFICATION

(71) Applicant: Amazon Technologies, Inc., Reno, NV (US)

(72) Inventors: Mark Glyn Morgan, Banbury (GB); Wesley Shawn Davis, Seattle, WA (US); Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/849,457

(22) Filed: Mar. 22, 2013

(51) Int. Cl.
*H04N 5/93* (2006.01)
*H04N 9/87* (2006.01)

(52) U.S. Cl.
CPC ....................... *H04N 9/87* (2013.01)

(58) Field of Classification Search
None
See application file for complete search history.

(56) References Cited

U.S. PATENT DOCUMENTS

| | | |
|---|---|---|
| 2005/0060350 A1* | 3/2005 | Baum et al. ............ 707/104.1 |
| 2010/0071013 A1 | 3/2010 | Vandermolen et al. |
| 2010/0287473 A1* | 11/2010 | Recesso et al. ............ 715/716 |
| 2011/0225615 A1* | 9/2011 | Stonedahl ............ 725/86 |
| 2012/0011551 A1 | 1/2012 | Levy et al. |
| 2012/0219271 A1* | 8/2012 | Vunic et al. ............ 386/278 |
| 2012/0321277 A1* | 12/2012 | Lee ............ 386/230 |

* cited by examiner

*Primary Examiner* — William C Vaughn, Jr.
*Assistant Examiner* — Eileen Adams
(74) *Attorney, Agent, or Firm* — Thorpe North & Western (57) ABSTRACT

Technology is described for identifying a scene in video content. Video content to be played on a device may be provided. A segment of the video content that includes an occurrence of an interest event may be identified. A scene may be created with the segment based on a starting time code of the segment. The scene with the segment may be provided for playback.

26 Claims, 9 Drawing Sheets

SCENE IDENTIFICATION

BACKGROUND

Increases in network speeds combined with the benefits associated with viewing content from one's own home have resulted in the growing popularity of watching video content over a network. For example, a user may watch a movie at home without having to drive to a video rental kiosk. In addition, the user may avoid being inconvenienced by having to watch the movie at a pre-scheduled time (e.g., during a television broadcast or according to play times at a movie theater or using pay-per-view on cable). The ability to watch video content over a network at a desired time may provide flexibility to the user's schedule.

A user may also select from a wide variety of video content based on individual preference and/or mood when viewing video over a network. For example, the user may be in the mood to watch a horror movie, and therefore may select from a list of horror movies without having to watch an already scheduled program. The user may also view the latest episode of a favorite television series. In addition, the ability to watch video content on a wide variety of devices (e.g., desktop computers, laptop computers, televisions, cell phones, gaming systems, tablet computers) may provide the additional convenience of watching the video content in a variety of places (e.g., a coffee place, bookstore, or mall). When watching video content over the network, the user may desire to skip certain parts of the video (e.g., a boring scene in a movie) and jump to subsequent scenes in the video content. In addition, the user may desire to replay a previously watched scene in the video content.

DETAILED DESCRIPTION

This technology relates to identifying and providing scenes for video content obtained over a network. A user may watch video content (e.g., movies, television programs, live broadcasts) on a device connected to the network. The video content may be live or pre-recorded. The video content may be streamed over a network, transmitted in burst mode, partially downloaded, or obtained via any other suitable mechanism for transferring video content over a network. When watching video content over the network, users may identify a scene in the video content that the user has viewed in the video content to enable replaying of the identified scene from the video content.

The video content may be provided to one or more devices over the network. For example, the video content may be provided simultaneously to a first screen device (e.g., a television) and a second screen device (e.g., a tablet computer). Video content provided to the first screen device may be different than the video content provided to the second screen device. The user may replay scenes on the second screen device that were previously played on the first screen device. For example, the user may be streaming a live tennis match on the first screen device. The tennis match may include an interest event (i.e., an event that the user wishes to watch again). In this example, the interest event may be a spectacular shot made by a tennis player. An option to replay the scene with the interest event may be displayed on the second screen device. The user may replay the scene on the second screen device, while the live tennis match is being played on the first screen device. The first screen device and/or the second screen device may store a predetermined amount of video (e.g., the first 5 seconds of each scene) in a cache so that the video may be played with minimal delay. Further, the cache may store the first five seconds of each scene of the video that was previously watched by the user.

When providing a replay of a scene from the live video content to the device, various parameters of the scene (e.g., a starting time code) may be determined. For example, the time parameters of the scene may be determined from interest event indicators that occur during a live video broadcast. Interest event indicators may be created by a user who is viewing the broadcast, or the interest event indicators may be created automatically using machine identification. The interest event indicators may mark at what time point an interest event has occurred. The occurrence of an interest event indicator may automatically result in an interest event being identified and tagged. For example, the interest event indicators may include a score change (e.g., from a touchdown, a goal, etc.) in a game of football, soccer, basketball, tennis, etc. In addition, the interest event indicators may include increased cheering from the crowd (e.g., in a boxing match after a knockout punch). Once an interest event is identified and tagged, a scene with the interest event may be defined.

In one configuration, the scene may begin a certain time period before and end a certain period after the interest event occurs to form a time window. For example, the scene may begin 20 seconds before a touchdown is scored and end 30 seconds after the touchdown is scored. The time period may vary depending on the type of video content being provided (e.g., the time period may be 15 seconds for a basketball game, but 30 seconds for a football game). Once the scene is defined, an option to replay the scene may be displayed on the first screen device and/or the second screen device. The scene may be replayed in slow motion or at a normal speed.

The parameters of each scene (e.g., the length of each scene) may be identified using heuristics. For example, the length of each scene may be inferred based on the type of video content (e.g., television show, sporting event, political event, etc.). The length of each scene may be heuristically determined based on the overall length and structure for that particular show. In addition, the occurrence of a "fade to black" (e.g., when the screen briefly becomes black to indicate that a new scene is starting) in video content may be used to help determine the parameters of the scene.

When watching video content over a network, users may identify or mark selected portions of video content. For example, the user may identify an interesting portion of video content (e.g., an exciting play, a thought-provoking statement). By identifying the portion of video content, the user may create a scene with the selected portion of video content. The user may then replay the scene on a first screen device or a second screen device. The scene may include the interest event, as well as a time interval before and after the interest event (e.g., 20 seconds before the interest event begins and 20 seconds after the interest event finishes). The time interval may be referred to as a time window surrounding the interest event. The user may be able to customize the time window based on personal preference by accessing a menu on the second screen device. The user may then select the scene to be replayed using the second screen device. When the user identifies or marks an interest event in the video content, a new starting time code associated with the interest event may be created. Furthermore, the new time code may be embedded into video content metadata that describes the video content. Thus, when the user wishes to replay the scene, the video content may be provided to the device starting from the new starting time code embedded into the video content metadata.

In addition, the user may share the scene created by the user with a group of users, thus enabling the group of users to view the scene on the group's first or second display devices. A list of scenes based on feedback from a group of users (i.e., group sourcing) may also be displayed on the first screen device or the second screen device. The scenes may be ranked or categorized based on viewings, voting, and/or ratings from the group of users. Furthermore, the user may be able to watch a highlight video containing a plurality of scenes that were recommended by the group of users (e.g., a highlight reel from a basketball game). The highlight video may contain a plurality of related scenes or various different scenes from a group of related movies, television shows, etc. The user may select a scene from the highlight video in order to play a full video containing that scene from the beginning. The group of users may share scenes of live video content, as well as scenes in pre-recorded video content, such as movies and television programs. When a user shares a scene, a link with a starting time code of the scene may be sent to the group of users. When the user wishes to watch the scene, the scene may begin playing at the starting time code as found in video content metadata created by the sender. The scenes that are shared by the group of users may be displayed on the second screen device, while video content is being played on the first screen device. For example, a user may be watching a basketball game on the first screen device. While on the second screen device, a list of shared scenes from the basketball game may be displayed on the second screen device for replay.

Figure 1:
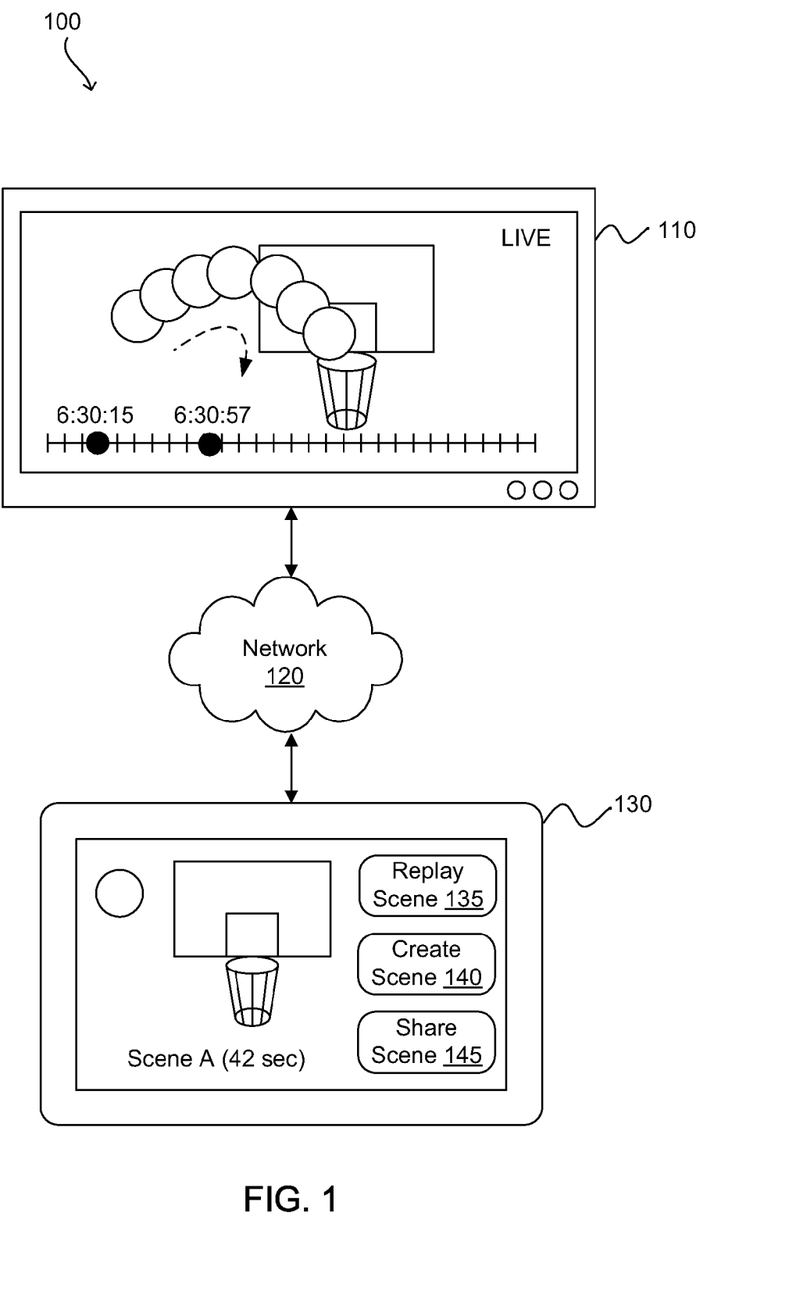
FIG. 1 is an illustration that depicts a system for scene identification in video content according to an example of the present technology.

FIG. 1 is an illustration that depicts a system 100 for scene identification in video content according to various examples of the present technology. A first screen device 110 may be coupled to a second screen device 130 over a network 120. Alternatively, the first screen device 110 may be paired directly to a video playback console which is capable of displaying video on the first screen device.

The first screen device 110 may be playing live video content (e.g., a basketball game). A time code associated with the live video content (e.g., 6:30:15 PM) may also be displayed, and the time code may include the current hour, minute, and second of the live video content. The second screen device 130 may include a user interface with options to replay 135, create 140, and/or share the scene 145 from the live video content (e.g., Scene A). For example, the user may replay the scene (e.g., Scene A) that was previously played by the first screen device 110. The user may create a scene 140 by identifying an interest event from the live video content played on the first screen device 110. The interest event may be identified when the user presses the "Create Scene" option 140 on the second screen device at the start of the interest event. Once the scene with the interest event is created, the user may share the scene with a group of users.

Figure 2:
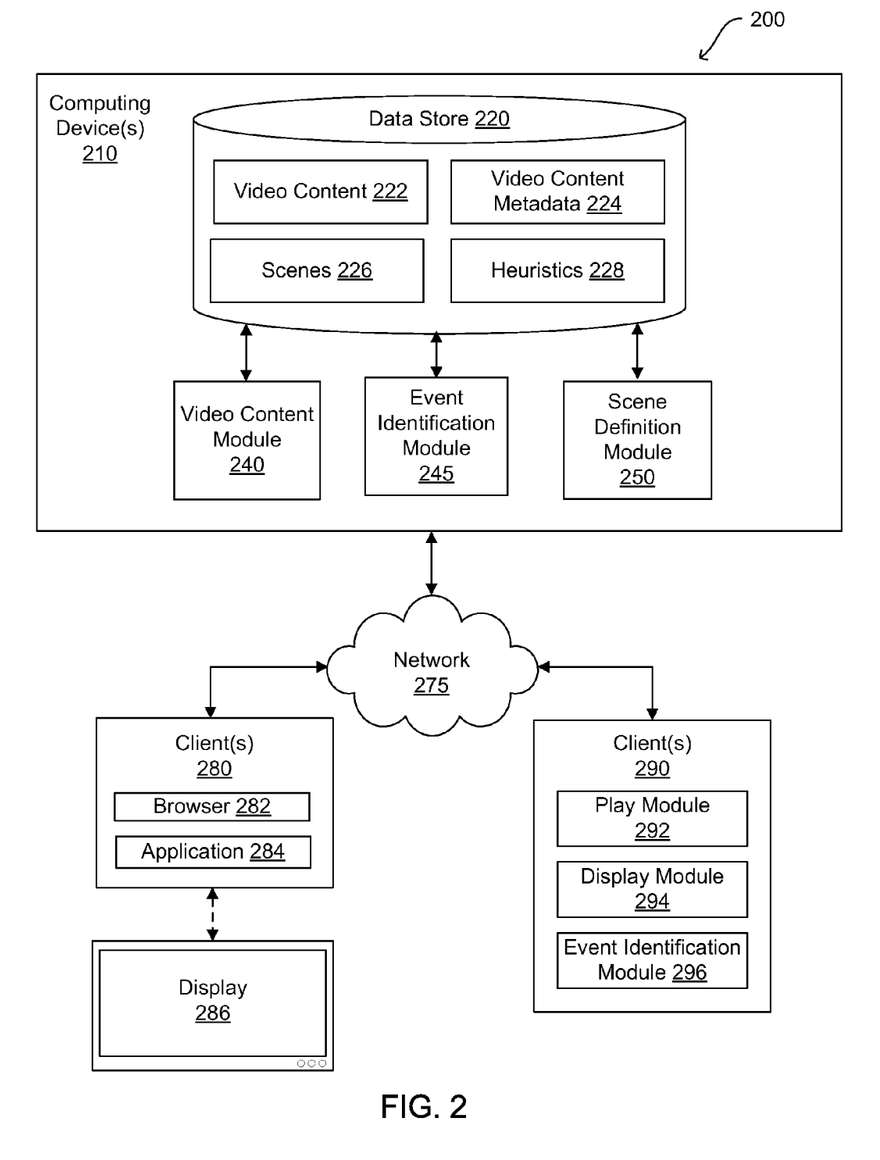
FIG. 2 is an illustration of a networked system for scene identification according to an example of the present technology.

In the following discussion, a general description of an example system and the system's components are provided, followed by a discussion of the operation of the system for providing the technology. FIG. 2 shows a networked environment 200 according to various examples of the present technology. The networked environment 200 may include one or more computing devices 210 in data communication with a first screen client 280 and a second screen client 290 by way of a network 275. The network 275 may include the Internet, intranets, extranets, wide area networks (WANs), local area networks (LANs), wired networks, wireless networks, or other suitable networks, etc., or any combination of two or more such networks.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a cloud computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The first screen client 280 and the second screen client 290 are representative of a plurality of client devices that may be coupled to the network 275. The first and second screen clients 280 and 290 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability. The first screen client 280 (e.g., a television) may have lessor mobility and be larger in size as compared with the second screen client 290 (e.g., a mobile phone, a tablet computer).

The first screen client 280 may be configured to execute various applications such as a browser 282, and/or other applications 284. The applications 284 may correspond to code that is executed in the browser 282. The applications 284 may also correspond to standalone applications, such as mobile applications. In addition, the first screen client 280 may be configured to execute applications 284 that include, but are not limited to, video playback applications, standalone applications, email applications, instant message applications, and/or other applications. The applications 284 may play video content on the first screen client 280.

The first screen client 280 may include or be coupled to a respective display 286, as well as the browser 282. The browser 282 may be executed on the first screen client 280, for example, to access and render network pages, such as network pages (e.g. web pages), or other network content served up by the computing device 210 and/or other servers. The display 286 may comprise, for example, one or more devices such as cathode ray tubes (CRTs), liquid crystal display (LCD) screens, gas plasma-based flat panel displays, LCD projectors, or other types of display devices, etc.

The second screen client 290 may include a play module 292, a display module 294, and an event identification module 296. The play module 292 may be programmed to play video content 222 received from the computing device 210. The play module 292 may play live video content (e.g., live sporting events) or pre-recorded video content (e.g., movies, television shows). The play module 292 may replay a previously played scene (e.g., an exciting soccer goal). In other words, the play module 292 may replay a scene containing an interest event. The play module 292 may replay the video scene or identified video segment in response to receiving instructions from a user. The play module 292 may play video scenes from the overall video content 222 that is simultaneously being played on the first screen client 280. Alternatively, the play module 292 may play video content 222 that is different than the video content being played on the first screen client 280. The play module 292 may also play a highlight video containing a plurality of scenes with interest events.

The display module 294 may be programmed to display a list of scenes for replay. The display module 294 may display the list of scenes from live video content while the live video content is being played on the first screen client 280. The second screen client 290 may possess a smaller screen and greater mobility as compared with the first screen device 280. The display module 294 may display a video preview and/or an image preview for each scene in the list of scenes. As an additional preview mechanism, the display module 294 may display a sequence of images from the scene in response to moving a cursor over a scene on the display or by touching the scene of a touch screen device. The display module 294 may display scene information associated with the scene (e.g., date, length, number of views, ratings, etc.). The display module 294 may include options to play the scene, preview the scene, replay the scene, share the scene, and/or view user comments associated with the scene. Scene lists may be displayed on the display module 294 based on popularity, number of views, ratings, and/or by other metrics.

Various applications and/or other functionality may be executed in the computing device 210 according to various embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include video content 222, video content metadata 224, scenes 226 and/or heuristics 228. As used herein, the term "video content" generally refers to live video content and/or pre-recorded video content. The live video content may include live broadcasts, such as sporting events, political events, local and world events, live dramatic shows, news casts, live reality television, etc. The pre-recorded video content may include pre-recorded television shows, movies, home videos, etc. The video content 222 may be uploaded or transmitted to the data store 220 by a plurality of users or the video content may be professionally created. More specifically, the video content 222 may be uploaded to the data store 220 after being received by video content providers (e.g., movie studios, television networks). The video content 222 may be streamed over the network 275 to the first and second screen clients 280 and 290. In the case of live video, the video content may be send out to users within seconds are being stored in the video content 222 data store.

The data stored in the data store 220 may include video content metadata 224. The video content metadata 224 may be linked to individual video content included in the video content 222 data store. The video content metadata 224 may include one or more time codes indicating a beginning and/or an ending of a scene. The video content metadata 224 may be provided by video content providers and/or created by the user. The video content metadata 224 may be modified when a user identifies and/or creates a scene 224 from the video content 222. The time codes defining the scene created by the user may be included in the video content metadata 224. Thus, the video content metadata 224 created by a user may be stored in the data store 220. When the user shares the scene with a plurality of users, the video content metadata 224 may be accessed by the plurality of users. The video content metadata 224 may also include information about an encoding/decoding scheme for the video content, frames per second, bit rate, video resolution, key words that describe the nature of the video content, and other types of data for describing the video content 222.

The data stored in the data store 220 may include scenes 224 identified in the video content 222. For example, the video content 222 may be a 1-hour presidential speech, and the scene 226 may be a 1-minute clip of the speech. The scene 226 may include an occurrence of an interest event (e.g., an exciting play, a memorable line from a speech, etc.). The scenes 226 may include a time window (e.g., 30 seconds) before and after the occurrence of the interest event. The time window may automatically vary depending on the type of event (e.g., 20 seconds before a basketball play occurs or one minute after a football touchdown). In addition, the time window may be determined by the user. For example, an exciting soccer goal may occur at a time code of 66:33 and based on user instructions, the scene 226 may begin at a time code of 66:03 (i.e., 30 seconds prior to an occurrence of the interest event) and end at a time code of 66:53 (i.e., 20 seconds after the interest event occurs). In addition, the scenes 226 may be identified by video content providers and/or a plurality of users.

The data stored in the data store 220 may include heuristics 224. The heuristics 224 may be used to identify scenes 226 in the video content 222. The heuristics 224 may include historical scene data to assist in creating rules that enable the identification of scenes in various types of video content (e.g., live content, movies). The historical scene data may include typical scene lengths for a number of different video content types (e.g., typical scene lengths are nine minutes long for movies and seven minutes long for live basketball games). In addition, the heuristics 228 may include using interest event indicators to identify scenes 226. For example, the interest event indicators may detect a fade-to-black event (i.e., when the screen temporarily becomes black to indicate a change of scene). The interest event indicators may also detect various events that occur when the live video content is played. For example, an increase in crowd cheering from a boxing match may be used to identify the scene 226. As another example, a change in score (e.g., a football team's score changes from three to ten) may be used to identify the scene 226. Additional heuristics 228 may be used for identifying scenes 226 in the video content 222. When a heuristic rule is used and detects a possible scene, the scene may automatically be created for live video or the system may query the user as to whether the user may want to create a scene based on the interest event indicator that was detected.

The components executed on the computing device 210 may include a video content module 240, an event identification module 245, a scene definition module 250 and other applications, services, processes, systems, engines, or functionality not discussed in detail herein. The video content module 240 may be programmed to provide live video content (e.g., sporting events, political events, local or world news, game shows, etc.) to the first and second client devices 280 and 290 to be played. The video content module 240 may provide the live video content to a first screen device (e.g., a television) and/or a second screen device (e.g., a tablet computer). In addition, the video content module 240 may provide a user selected or automatically identified scene 226 taken from the live video content. The scene 226 may include an interest event (e.g., an exciting soccer goal, a humorous comment).

In another configuration, the video content module 240 may provide the live video content and/or the scene to the first screen device while simultaneously providing a replay of the scene 226 to the second screen device. The video content module 240 may provide the scene 226 to the device with a time window before and after the interest event occurs. The video content module 240 may determine a starting time code of a scene 226 from the video content 222, and then provide the scene 226 based on the starting time code. Further, the video content module 240 may provide a highlight video or list of highlights containing a plurality of scenes 226 based on a popularity ranking.

The event identification module 245 may be programmed to identify an interest event that occurs in the video content 222. The event identification module 245 may identify the interest event based on heuristics 228 (e.g., fade to black, historical scene data, crowd cheering, change of score in sporting event, etc.). In another configuration, the event identification module 245 may identify the interest event based on instructions received by a user. Thus, the event identification module 245 may be included in the second screen client 290. For example, the user may identify a scene of a live tennis match as an interest event, and the video content module 240 may provide a replay of the scene. A starting time code for the scene can also be stored in the scenes 226 data store. In addition, the event identification module 245 may identify interest events in live video content based on feedback from a group of users (i.e., group sourcing). For example, a user in the group of users may identify a scene in the tennis match as having an interesting event. Then the user may share the scene with other users in the group of users.

The scene definition module 250 may be programmed to automatically define a scene 226 with an interest event (e.g., flagged by a user or also identified automatically). The scene definition module 250 may define the scene 226 based on a starting time code of the interest event as provided by the user. For example, the interest event may be a three-point basket in a basketball game. The interest event (i.e., the scored basket) may be two seconds long. However, a replay of the interest event may provide the user with some context surrounding the play. Thus, 10 seconds may be provided in the scene to surround the interest event and the interest event may be at the center of the scene. Of course, the interest event may also be at the beginning or end of the scene. Similarly, the scene definition module 250 may create the scene 226 with a time window before and after the interest event occurs. For example, the 20 seconds of the basketball game prior to the three-point basket may be included in the scene 226. The scene identification module 250 may determine the time window automatically based on user settings. In one configuration, the time window may include a period of time since the previous change of score in the sporting event. In addition, the scene definition module 250 may determine the time window based on instructions entered by the user for a particular interest event. For example, after witnessing an exciting soccer goal, the user may instruct the scene definition module 250 to create a scene beginning two minutes before the soccer goal was scored and ending one minute after the soccer goal. When the user creates a new scene, the scene definition module 250 may modify the video content metadata 224 to include the time codes associated with the new scene.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 3:
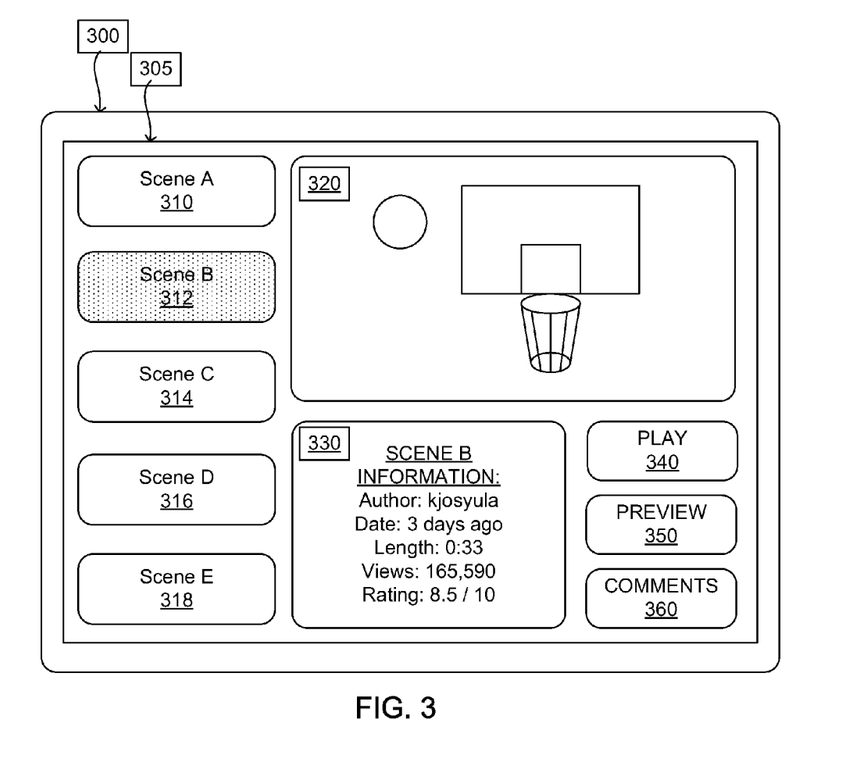
FIG. 3 illustrates an exemplary user interface rendered by a client for viewing video content generated by feedback from a plurality of users according to an example of the present technology.

FIG. 3 is a drawing that illustrates an exemplary user interface 305 rendered by a device 300 for viewing video content based on user feedback. The user interface may include a plurality of scenes, such as Scene A 310, Scene B 312, Scene C 314, Scene D 316, and Scene E 318. The scenes may be identified based on feedback from a plurality of users. For example, a user may be watching an awards ceremony as live video. Other users may identify and create scenes from the awards ceremony. For example, a user may create a scene with a thank you speech by an award winner, and an additional user may create a scene with a musical performance included in the awards ceremony. These scenes may be included as Scene A 310, Scene B 312, etc. While watching the awards ceremony on a first screen device, the user interface 305 displaying the plurality of scenes may be part of a second screen device. Alternatively, the user may switch from the awards ceremony to the user interface 305 on the first screen device.

The user interface 305 may allow the user to view information associated with a specific scene (e.g., Scene B 312). For example, such information may be displayed when the user moves a cursor over the scene. In addition, moving the cursor over the scene may highlight the scene. The user interface 305 may include a play option 340 to play the highlighted scene, and the user interface 305 may include a preview option 350 to preview the highlighted scene via a video play area 320. The video play area 320 may provide a video preview and/or an image preview of the highlighted scene. The user interface 305 may include comments 360 associated with the highlighted scene. In addition, the user interface 305 may include scene information 330 about the highlighted scene. The scene information 330 may include the author, the date of creation, the length, the number of views, and the ratings associated with the highlighted scene.

In one configuration, the plurality of scenes displayed on the user interface 305 may be automatically generated based on interest event indicators. For example, the interest event indicators may include an increase in crowd cheering, a change of score in a sporting event, a fade-to-black scenario, etc. Upon an occurrence of an interest event indicator, a scene with the interest event may be automatically generated. The user interface 305 may allow the user to replay the scene that was automatically generated based on the interest event indicator. In other words, while the user is watching video content on a first screen device, a plurality of scenes relating to the video content may be displayed for replay on a second screen device. When the scene is replayed, the video content may be provided according to the beginning time code associated with the interest event.

Figure 4:
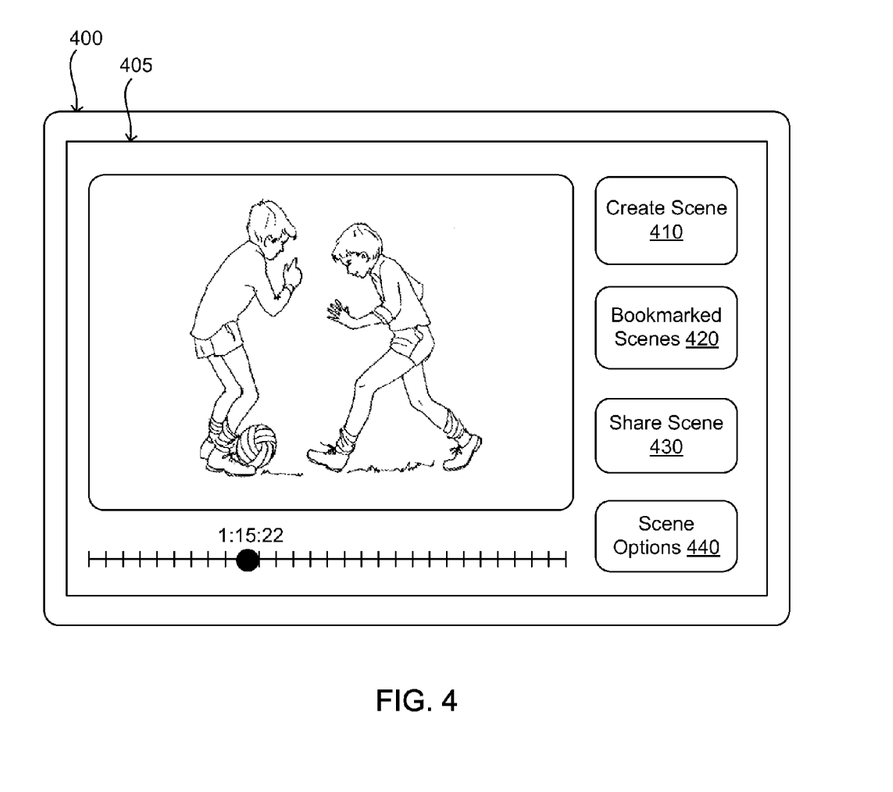
FIG. 4 illustrates an exemplary user interface rendered by a client for creating and sharing scenes of video content according to various an example of the present technology.

FIG. 4 is a drawing that illustrates an exemplary user interface 405 rendered by an example device 400 for creating and sharing scenes of video content. For example, a user may be watching video content (e.g., a live soccer match) on a first screen device (e.g., a television). The video content may include live video content and/or pre-recorded video content. The user may use a device, via the user interface 405, to create and share scenes taken from video content currently being played. In particular, while watching the live soccer match on the first screen device, the user may use the second screen device to create a scene 410 from the video content, view bookmarked scenes 420, share the scene 430 with other users, and/or change scene options 430. The user may create the scene 410 by indicating that an interest event has occurred. For example, the user may select an option to create a scene after a goal is scored in the soccer match. The video content metadata may subsequently be modified to include a starting time code of the newly created scene.

While watching video content, the user may bookmark a plurality of scenes that have been created in order to replay the scenes in the future. For example, while watching a live basketball game, the user may bookmark a number of plays from the game in order to replay the scenes at a later time. Later, the user may access the bookmarked scenes via the user interface 405. When the user instructs the device to replay a bookmarked scene, the bookmarked scene may be played based on a starting time code of the bookmarked scene as found in the video content metadata created by the user.

The user may share the bookmarked scenes with a plurality of users. For example, the user may share the bookmarked scenes with an existing social group (e.g., the user's friends) or an interest oriented group (e.g., a fantasy football league group). In this example, the user may choose to select specific social associates for scene sharing. Alternatively, the user may share the bookmarked scenes via a web application, which in turn provides the bookmarked scenes to a plurality of users. For example, a user watching a live global news program may identify an interesting scene, and then upload a link to that scene to the web application. The web application may provide a link to that interest scene to additional users who are watching the same news program. The additional users may watch the scene based on the starting time code of the scene included in the video content metadata.

The scene options 430 may determine certain parameters (e.g., a default length) for the scene created by the user. In one configuration, the user may set the default rule that the time window surrounding the interest event may be automatically determined based on the type of interest event. Alternatively, the user may set the time window manually for each scene that is created. By having the scene include a time window surrounding the interest event, additional context in the scene may be provided to the user. In addition, the scene options 440 may include a plurality of customizable settings relating to creating scenes with interest events, bookmarking the scenes, and sharing the scenes with a plurality of users.

Figure 5:
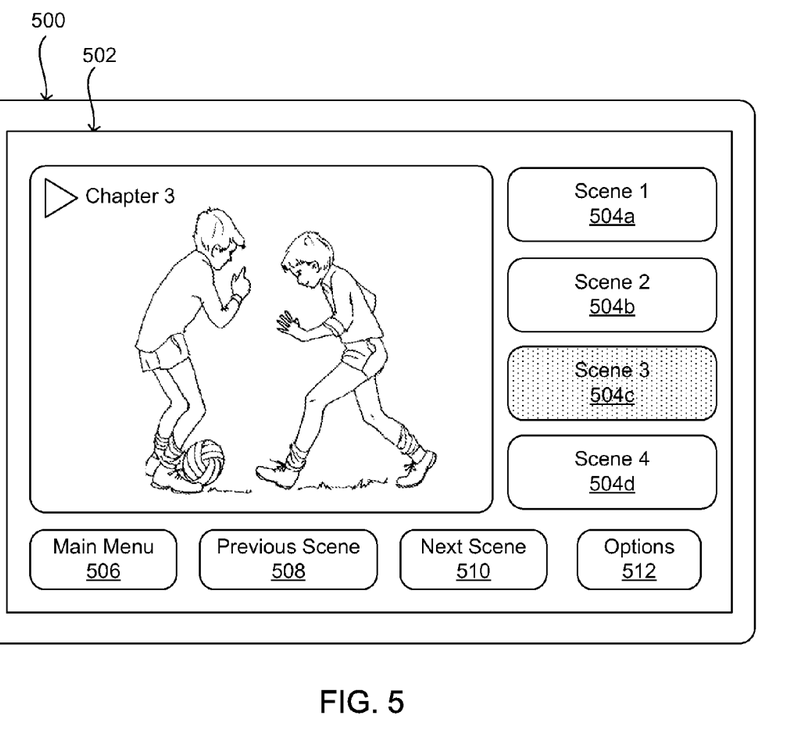
FIG. 5 illustrates an exemplary user interface rendered by a client for navigating through scenes in video content.

FIG. 5 is a drawing that illustrates an exemplary user interface rendered by a device 500 for navigating through scenes in video content. The user interface 502 may include a list of scenes in the video content to be played, such as Scene 1 504a, Scene 2 504b, Scene 3 504c, and Scene 4 504d. The device may play the scenes upon receiving instructions from a user. The list of scenes may be displayed while the video content is being played on the device, or the list of scenes may be included as a separate menu. The list of scenes may include a video and/or image preview for each scene. In addition, the user interface 502 may indicate the scene currently being played on the device by highlighting the scene (e.g., Scene 3).

The user interface 502 may include options to access a main menu 506, a previous scene 508, a next scene 510, and scene options 512. The user may skip backwards to the previous scene and/or skip ahead to the next scene in the video content. In one configuration, the video content being provided to the device may already be divided into a plurality of scenes. For example, the user may be watching a movie with a new scene beginning approximately every seven minutes. Thus, the user may skip to the next scene based on existing metadata in the video content that indicates a starting time code of the next scene. The existing metadata may be provided by video content providers (e.g., television networks, movie studios). Additionally or alternatively, the existing metadata may be formed based on instructions received by the user. For example, the user may identify an additional scene in the video content by marking a starting time code of the additional scene. The additional scene identified by the user may be a subset of an existing scene in the video content. When the user marks the starting time code of the additional scene, the existing metadata of the video content may be modified to include the starting time code of the additional scene. Thus, the metadata of the video content may include time codes given by video content providers, as well as time codes that are added based on user instructions. Thus, when the user switches to a different scene, the starting point of the scene may be determined by accessing the time codes in the metadata. Furthermore, the scenes defined by the video content providers may be stored and accessed separately from the scenes that are defined by user instructions.

In addition, a portion of the previous scene and the next scene may be stored in a cache of the device. For example, the first ten seconds of the next scene may be stored in the cache in anticipation of the user skipping to the next scene. Furthermore, a portion of previously played scenes may be stored in the cache to provide a faster scene load time when the user skips backward to the previous scene.

Figure 6A:
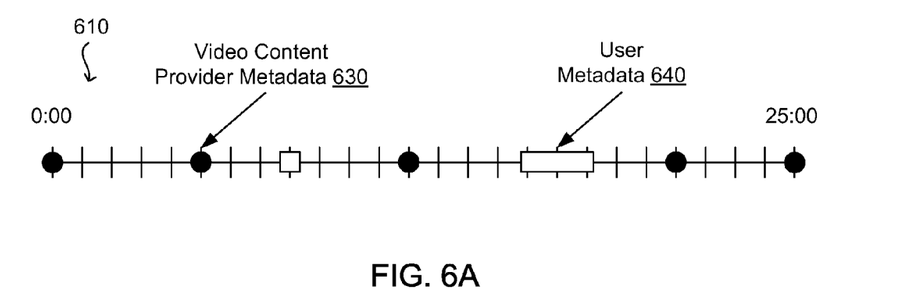
FIGS. 6A and 6B illustrate video content metadata embedded with specific time codes according to an example of the present technology.
Figure 6B:
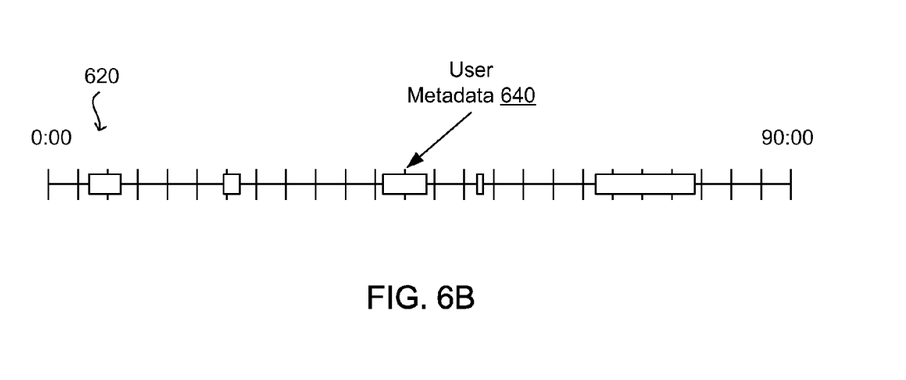

FIGS. 6A and 6B illustrate exemplary metadata 610 and 620 that describe the scenes for the video content. The metadata 610 may be embedded with information identifying a specific time code as a beginning time code of a scene. When a user switches to a scene which is different than the scene currently being provided, the scene may be played on the device according to the starting time code of the scene as identified in the metadata 610. In other words, the video content may include time-coded metadata useful for identifying and providing scenes in the video content. As an example, the metadata 610 may be used to identify scenes in a television program having a length of 25 minutes. As shown in FIG. 6A, the metadata 610 may include video provider content metadata 630 and/or user metadata 640. The video provider content metadata 630 may include metadata supplied by video content providers (e.g., television networks, movie studios). For example, the video content providers may describe the length of each scene (i.e., the starting time codes of each scene) in the video content via the metadata 610.

Additionally, the metadata 610 may include user metadata 640 generated by a plurality of users. The users may generate the user metadata 640 by creating scenes for the video content. When the user identifies a new scene for the video content, the metadata 610 may be modified to include a starting time code associated with the new scene. The metadata 610 of the video content may be modified in real time when the user identifies new scenes while the video content is being provided. The metadata 610 may include both video provider content metadata 630 and the user metadata 640 in order to enable the identification and creation of scenes to the device.

FIG. 6B shows metadata 620 for video content (e.g., a 90-minute live video program) that does not include existing metadata from video content providers. In other words, the video content may not be divided into a plurality of scenes. Thus, the metadata 620 may be modified based on the user metadata 640 to create new scenes as the live video content is viewed. For example, a user may identify a plurality of scenes in the live video content. The starting time codes associated with the plurality of scenes may be added to the user metadata 640 in real-time (i.e., as the user identifies each scene). If the user switches to a preceding scene or replays a previously played scene, the device may play the scene based on the user metadata 640.

Figure 7:
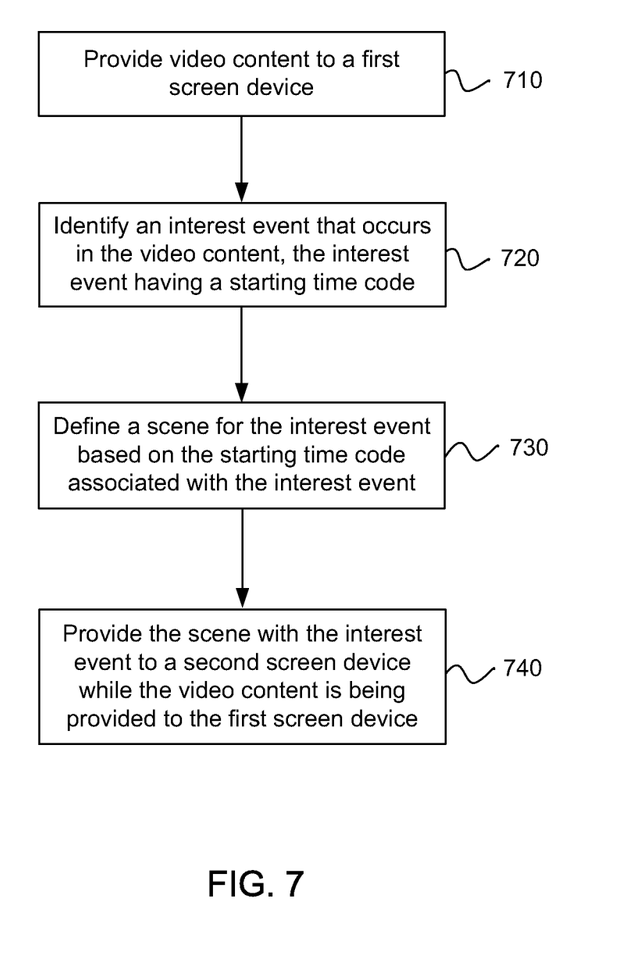
FIG. 7 is a flowchart of an example method for identifying a scene in live video content using a computing device.

FIG. 7 illustrates an example of a method for identifying a scene in live video content. The method may include the operation of providing live video content to a first screen device, as in block 710. The first screen device may include a television, projector, desktop computer, laptop computer, tablet device, mobile phone, etc. The live video content may be divided into a plurality of scenes by the user or the scenes may be automatically identified. The live video content may include sporting events, political events, local or world news, game shows, etc.

An interest event that occurs in the live video content may be identified by the user or by an automatic event identification module, and the interest event may have a starting time code, as in block 720. The interest event that occurs in the live video content may also be identified based on feedback from a group of users. For example, a group of users may identify and share interest events from a soccer match. The interest event may be heuristically determined based on events that occurs during the live video content, such as crowd cheering, a change of score in a sporting event, etc.

A scene for the interest event may be defined based on the starting time code of the interest event, as in block 730. The scene with the interest event may include a time window before and after the interest event occurs. For example, the scene may begin a certain period of time (e.g., 30 seconds) before the interest event (e.g., a touchdown) occurs. The time window may be determined automatically based on the type of event (e.g., tennis), or the time window may be determined by the user after the interest event occurs.

The scene information for the interest event may be provided to a second screen device while the live video content is being provided to the first screen device, as in block 740. Thus, the first screen device may play live video while the second screen device replays the scene with the interest event. For example, a user may be watching a live soccer match on a television while watching a replay of a previous goal on a tablet computer. In addition, the first screen device and/or the second screen device may store a portion of the scene (e.g., the first five seconds of the scene) in the cache. By storing video in the cache, a loading time associated with watching the video may be reduced. In the case where a scene is created for live video, the entire live video may be cached on first screen or second screen device when the interest event is recorded.

Figure 8:
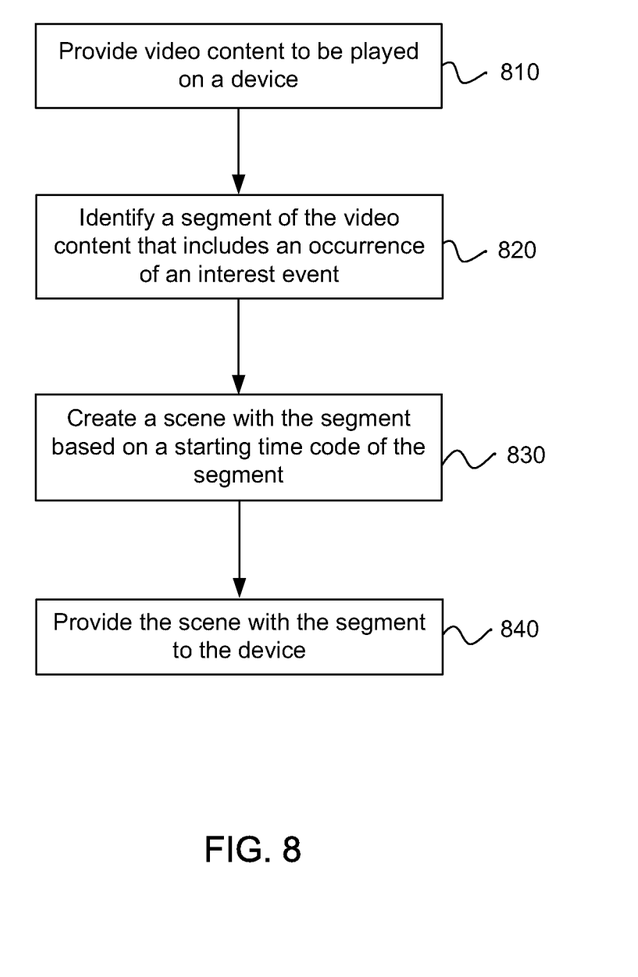
FIG. 8 is a flowchart of an additional example method for identifying a scene in live video content using a computing device.

FIG. 8 illustrates an example of a method for identifying a scene in live video content. The method may include the operation of providing live video content to be played on a device, as in block 810. The live video content may be provided to a first screen device (e.g., a television) and/or a second screen device (e.g., a mobile phone). The live video content may be divided into a plurality of scenes. The live video content may include sporting events, political events, local or world news, game shows, etc.

A segment of the video content may be identified that includes an occurrence of an interest event, as in block 820. The segment of the video content being provided may be identified using heuristics. For example, historical scene information, fade-to-black scenarios, crowd cheering, and other heuristics may be used to identify a segment of video content. The historical scene information may indicate that in a 30-minute television program, the scenes typically begin at time codes X, Y, and Z. Based on this data, a length of the scene may be heuristically determined. A segment of the video content may be identified by a plurality of users. For example, other users may identify and share scenes from the video content. In addition, a scene may be automatically shared based on receiving a percentage of total votes cast by the plurality of users or when a pre-defined number of positive reviews are received. Once a user views a shared scene, the user may play the scene and proceed to share the scene with additional users.

A segment of video content may be identified based on metadata received from a video content provider. For example, a television network may provide a television program with embedded metadata indicating the scene intervals (e.g., the first scene goes up to the sixth-minute marker). Thus, the segment may be identified from the embedded metadata.

A scene with the segment may be created based on a starting time code associated with the interest event, as in block 830. For example, the interest event may begin at a time code of 15:45. Thus, the scene with the interest event may begin at a time code no later than 15:45. In addition, the scene may include a time window surrounding the interest event (i.e., before and after the interest event occurs). The time window may depend on a type of interest event. For example, the time window may be 24 seconds before and after interest events that relate to basketball. The scene may be automatically created with a time window associated with the type of interest event, or the time window may be determined by the user.

The scene with the segment may be provided for playback, as in block 840. The scene containing the interest event may be replayed on the device in response to receiving instructions for replaying the scene. For example, a user may enter instructions to replay a previous scene in a political debate. The scene may be replayed on the second screen device while live video content is being played on the first screen device. Thus, the user may replay a thought-provoking line of the political debate while live coverage of the debate is being provided. A portion of the scene may (e.g., the first ten seconds of the scene) be stored in a cache of either the first screen device or the second screen device. By caching the beginning of the scene, the time involved in starting and/or loading the scene may be reduced.

A highlight video containing a plurality of scenes may be provided to the device. The highlight video may include the highest rated and/or popular videos, based on feedback from a plurality of users. The device may display a list of scenes taken from the video content currently being provided as determined by a group. The list of scenes may be included in a menu displayed on the device. The list of scenes may have been identified and shared through group sourcing (i.e., a group of users that identify and share scenes). The list of scenes may be displayed on the device based on popularity (e.g., ratings, number of views). For example, the most popular scenes may be displayed near the top of the screen while the least popular scenes may be display near the bottom of the screen. The display may include options to replay the scene and/or preview the scene.

In one configuration, video content may be provided to a device. The video content may be divided into a plurality of scenes. The device may receive instructions to jump to a scene in the video content different than the scene currently being provided. The scene may include a previously played scene. A starting time code of the scene to be provided may be determined from video content metadata describing the video content. The video content metadata may be generated by previous user instructions to the device. For example, a user may identify an additional scene in the video content, and the time codes describing the additional scene (e.g., a starting time code of the additional scene) may be included in the video content metadata. The device may be provided with the scene based on the starting time code included in the video content metadata. The device may store a portion of the previous or next scenes (e.g., the first five seconds of the scene) in a cache.

Figure 9:
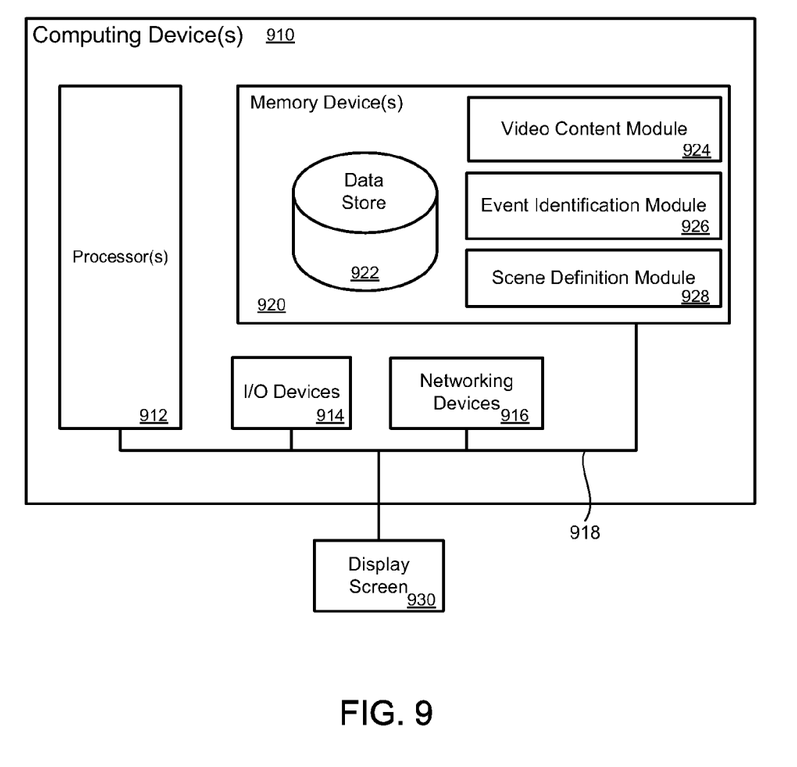
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules that are executable by the processor(s) 912 and data for the modules. Located in the memory device 920 are modules executable by the processor. For example, a video content module 924, an event identification module 926, and a scene definition module 928, and other modules may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 930 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for identifying a scene in live video content, the method comprising:
    under control of one or more computer systems configured with executable instructions:
    providing live video content to a first screen device;
    identifying an interest event that occurs in the live video content, the interest event having a starting time code;
    defining a scene for the interest event based on the starting time code associated with the interest event; and
    transmitting the scene with the interest event that has been captured from the live video content across a network to a second screen device for playback at the second screen device while the live video content is continuing to be presented on the first screen device.

2. The method of claim 1, further comprising replaying the scene with the interest event on the second screen device while the live video content is playing on the first screen device.

3. The method of claim 1, wherein the scene with the interest event includes a time window before and after the interest event occurs.

4. The method of claim 1, further comprising identifying the interest event that occurs in the live video content based on feedback from a group of users.

5. The method of claim 1, further comprising providing the scene with the interest event to the second screen device with a portion of the scene being stored in a cache of the second screen device.

6. A method for identifying a scene in video content, the method comprising:
    under control of one or more computer systems configured with executable instructions:
    providing video content to be played on a first screen device;
    identifying a segment of the video content that includes an occurrence of an interest event;
    creating a scene with the segment based on a starting time code associated with the interest event; and
    sending the scene with the segment that has been identified from the video content across a network to a second screen device for replay on the second screen device while the video content is continuing to be played on the first screen device.

7. The method of claim 6, further comprising replaying the scene containing the interest event on the second screen device in response to receiving instructions for replaying the scene.

8. The method of claim 6, further comprising providing the scene with the segment for playback to the first screen device or the second screen device.

9. The method of claim 6, wherein the video content includes live video content or prerecorded video content.

10. The method of claim 6, further comprising:
    receiving instructions from the second screen device to provide a scene in the video content different than the scene currently being provided to the first screen device, the scene including a previously played scene;
    determining a starting time code of the scene to be provided from video content metadata describing the video content, the video content metadata being generated from instructions previously received for identifying the scene in the video content; and providing the scene to the first screen device or the second screen device according to the video content metadata of the scene.

11. The method of claim 6, further comprising:
receiving a list of scenes taken from the video content currently being provided, the list of scenes being identified and shared through group sourcing; and
displaying the list of scenes to be replayed based on popularity as determined by a group.

12. The method of claim 11, further comprising providing a highlight video containing a plurality of scenes based on a popularity ranking, the plurality of scenes being created by group sourcing.

13. The method of claim 12, further comprising displaying a video preview for each scene in the list of scenes.

14. The method of claim 12, further comprising displaying an image preview for each scene in the list of scenes.

15. The method of claim 6, wherein identifying a segment of the video content that is being provided is based on metadata received from a video content provider.

16. The method of claim 6, further comprising displaying a menu with a list of scenes with interest events, the list of scenes taken from the video content.

17. The method of claim 6, further comprising storing a portion of the scene in a cache on the second screen device.

18. The method of claim 6, further comprising using heuristics to identify a segment of the video content that is being provided.

19. The method of claim 6, wherein providing the scene with the segment to the second screen device further comprises providing the scene beginning at a predetermined time period prior to the event occurring, the predetermined time period being heuristically determined based on a type of event.

20. The method of claim 6, further comprising:
receiving instructions from the second screen device, the instructions identifying an interest event from the video content; and
creating a scene with the interest event according to the instructions received from the second screen device.

21. A system for identifying a scene in video content, the system comprising:
a processor;
a memory device to store a plurality of entries of data and instructions that, when executed by the processor, cause the processor to execute:
a video content module configured to provide video content to a first screen device;
an event identification module configured to identify an interest event that occurs in the video content, the interest event having a starting time code; and
a scene definition module to define a scene with the interest event based on the starting time code, wherein the scene with the interest event that has been captured from the video content is transmitted to a second screen device over a network for playback at the second screen device while the video content is continuing to be presented on the first screen device.

22. The system of claim 21, further comprising a play module configured to replay the scene with the interest event on the second screen device while the video content is playing on the first screen device.

23. The system of claim 21, wherein the event identification module is further configured to identify the interest event that occurs in the video content based on feedback from a group of users.

24. The system of claim 21, wherein the video content module is further configured to provide the scene with the interest event to the second screen device with a portion of the scene being stored in a cache of the second screen device.

25. The system of claim 21, further comprising a display module configured to:
receive a list of scenes taken from the video content currently being provided, the list of scenes being identified and shared through group sourcing; and
display the list of scenes to be replayed based on popularity.

26. The system of claim 25, wherein the display module is further configured to display at least one of:
a video preview for each scene in the list of scenes; and
an image preview for each scene in the list of scenes.

\* \* \* \* \*